Nov. 23, 1937.  A. M. BUEHLER  2,099,795

FERTILIZER SOWING ATTACHMENT FOR SEEDING MACHINES

Filed Jan. 31, 1936

INVENTOR.
A. M. BUEHLER
BY
ATTORNEYS.

Patented Nov. 23, 1937

2,099,795

UNITED STATES PATENT OFFICE 2,099,795

FERTILIZER SOWING ATTACHMENT FOR SEEDING MACHINES

Allan Moyer Buehler, Preston, Ontario, Canada, assignor to Eastern Steel Products Limited, Preston, Ontario, Canada, a company of Canada Application January 31, 1936, Serial No. 61,786

3 Claims. (Cl. 111—52)

My invention relates to improvements in fertilizer sowing attachments for seeding machines, and the object of the invention is to devise an attachment which may be carried by the seed box of any make of drill for sowing the fertilizer with the seed, and it consists essentially of the arrangement and construction of parts all as hereinafter more particularly explained.

In the drawing like letters of reference indicate corresponding parts in each figure.

Figure 3:
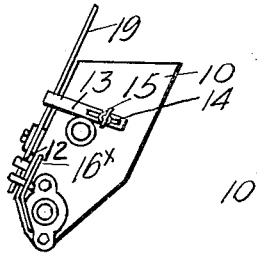
Fig. 3 is an end elevation of the fertilizer hopper looking at the right hand end thereof.
Figure 4:
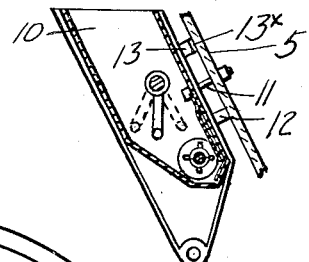
Fig. 4 is a cross sectional view through the hopper.
Figure 1:
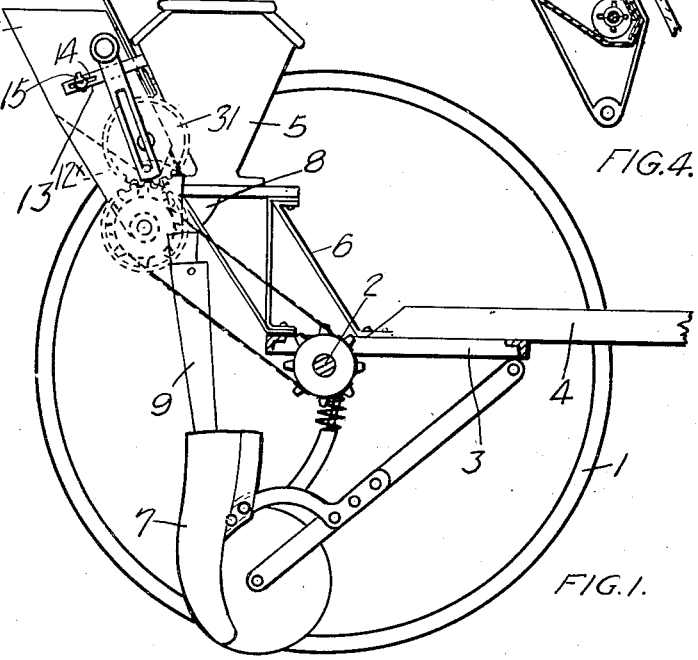
Fig. 1 is a side elevation with one of the carrier wheels of the seeding machine removed and showing the remainder of the mechanism and the fertilizer sowing attachment in elevation.

1 indicates one of the carrier wheels of a seeding machine, the other wheel being removed. 2 is the axle of the seeding machine on which is supported the main frame 3 to which is connected the draft tongue 4. 5 is the seed hopper of the seeder which is supported from the main frame 3 by the bracket members 6. 7 is the drill shoe which is connected to the main frame in the usual manner and into which the seed is fed from the hopper 5 by means of the feed mechanism indicated at 8 which feeds the seed into the flexible tube 9 which extends, at its lower end into the drill shoe 7.

In order to feed the fertilizer into the shoe 7 along with the seed, I provide the following attachment:—

Figure 2:
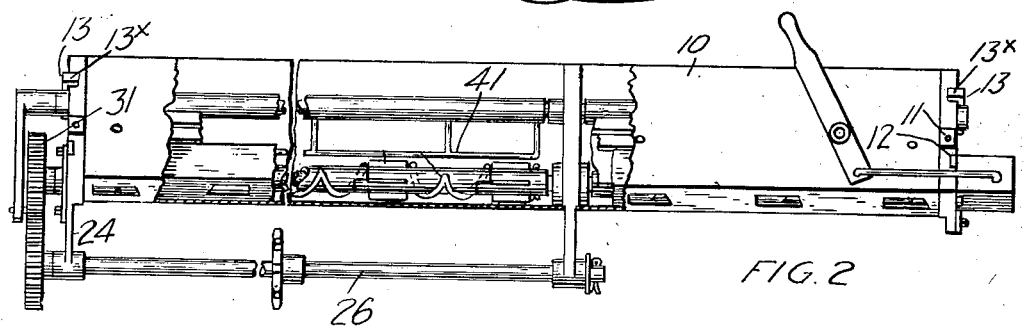
Fig. 2 is an enlarged detail showing a front elevation of a hopper of the fertilizer sowing attachment with the front wall and adjacent parts broken away to exhibit the interior mechanism thereof.

10 is a fertilizer hopper which is connected at each end to the back wall of the seed hopper 5 by means of a bolt 11. Each bolt 11 co-operates with a lug 12 cast integral with and extending from each metal end wall of the fertilizer hopper and against the wall of the seed hopper below the bolt 11 and also with a movable bar 13 provided with a longitudinal slot 14 through which a clamping bolt 15 extends for adjustably securing the bar to the fertilizer hopper. The upper end of each bar 13 is in-turned as indicated at 13× (see Fig. 2) so as to bear against the rear wall of the seed hopper above the bolt 11. By this means, when the bolts 15 are clamped tight and the bolts 11 are screwed tight, the lug 12 and turned end 13× of the bar 13 are drawn tightly into contact with the seed hopper 5 firmly securing the fertilizer hopper in the desired position.

In order to permit of the fertilizer hopper being secured to different types and shapes of seed hoppers, I have made the bars 13 longitudinally adjustable so that they may be clamped in any position to fit against each end wall of the seed hopper no matter what the shape of the seed hopper may be.

From this description it will be seen that I have devised a very simple construction of fertilizer feed which may be readily attached to any form of seed box.

What I claim as my invention is:—

1. The combination with a seed hopper of a seed drill, of a fertilizer feed hopper, a bolt extending through the wall of the seed hopper into the fertilizer hopper at each end, a lug extending from the fertilizer feed hopper below each bolt against the wall of the seed hopper, and a longitudinally adjustable member secured to the fertilizer feed hopper above each bolt so as to bear at one end against the wall of the seed hopper.

2. The combination with a seed hopper of a seed drill, of a fertilized feed hopper, a bolt extending through the wall of the seed hopper into the fertilizer hopper at each end, a lug extending from the fertilizer feed hopper below each bolt against the wall of the seed hopper, a bar located at each end of the fertilizer feed hopper having a longitudinal slot, and a securing bolt extending through the slot into the wall of the fertilizer hopper whereby the bar may be adjusted longitudinally to bear against the wall of the seed hopper.

3. The combination with a seed hopper of a seed drill, of a fertilizer feed hopper, a bolt extending through the wall of the fertilizer feed hopper into the wall of the seed hopper, means below the bolt for spacing the hopper definitely apart when the bolt is drawn into the seed hopper wall, and an adjustable stop above the bolt for spacing the hoppers any desired distance apart.

ALLEN MOYER BUEHLER.